J. EDGAR & A. BARDELL.
Fire-Shovels.

No. 158,478. Patented Jan. 5, 1875.

Witnesses:
Ernst Bilhuber
Henry Gentner

Inventors:
James Edgar
Alfred Bardell
pr
Van Santvoord & Hauff
Attrs

UNITED STATES PATENT OFFICE.

JAMES EDGAR, OF NEW YORK, AND ALFRED BARDELL, OF BROOKLYN, N. Y.

IMPROVEMENT IN FIRE-SHOVELS.

Specification forming part of Letters Patent No. 158,478, dated January 5, 1875; application filed November 28, 1874.

*To all whom it may concern:*

Figure 1:
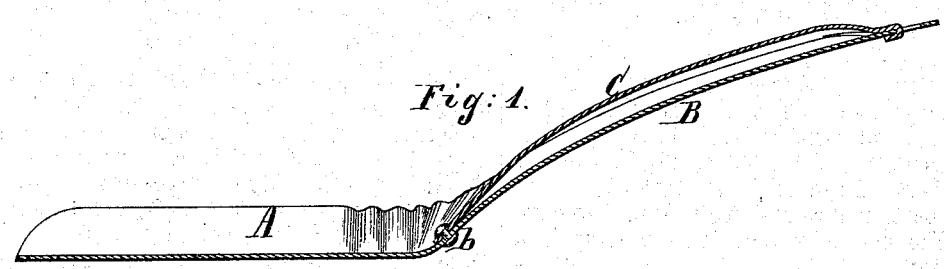
Figure 2:
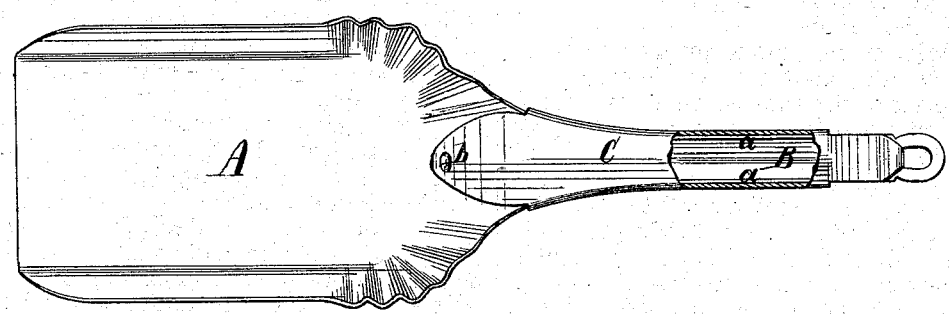
Figure 3:

Be it known that we, JAMES EDGAR, of the city, county, and State of New York, and ALFRED BARDELL, of Brooklyn, in the county of Kings and State of New York, have invented a certain new and useful Improvement in Fire-Shovels, of which the following is a specification:

This invention is illustrated in the accompanying drawing, in which Figure 1 represents a longitudinal section. Fig. 2 is a plan or top view, partly in section. Fig. 3 is a transverse section of the handle.

Similar letters indicate corresponding parts.

This invention relates to an improvement on that class of fire-shovels which are struck up of sheet metal, the body of the shovel and the handle being made out of one piece, and the handle being strengthened by making it V-shaped in cross-section. With this V-shaped handle we have combined a protector, which extends over its edges, and is secured to the back of the scoop, so that it forms a brace for the V-shaped handle, and prevents the edges thereof from coming in contact with the hand.

It is not intended by this invention merely to form a hollow handle for shovels, nor is the protector employed solely for the purpose of imparting strength and rigidity to the main handle. Its prime object, as hereinbefore stated, is to enable sheet-metal handles to be practically used in connection with sheet-metal shovels by covering the edges of such handles, so as to impart a rounded bearing-surface for the hand.

In the drawing, the letter A designates our shovel, which is struck up of sheet metal, with an extension, B, from its back edge. This extension is V-shaped in its cross-section, so that it will have sufficient strength to act as the handle for the shovel. The edges $a\ a$ of the extension B are covered by a protector, C, which is formed of sheet metal separate from the shovel A, and which is fastened to said extension by turning its edges down under the edges $a\ a$, as shown in Fig. 3. The inner end of the protector C is fastened to the back of the shovel A by a rivet, $b$. By these means said protector acts as a brace, whereby the handle of the shovel is materially strengthened, and at the same time the edges of the extension B are covered up, so that the hand which grasps the handle will not be injured, or so that said edges will not cut into the hand, and render the handling of the shovel uncomfortable.

By combining the protector C with the V-shaped extension B, a handle is produced which has no sharp edges or corners, and which is of sufficient thickness to afford a convenient hold for the hand; and since the protectors can be formed out of scraps of sheet metal, which are of little or no use for other purposes, the cost of the shovel is but slightly increased.

What we claim as new, and desire to secure by Letters Patent, is—

The combination of the protector C with the extension or handle B of a sheet-metal fire-shovel, the protector being constructed to cover and overlap the edges of the handle, and secured thereon, substantially in the manner herein shown and described.

In testimony that we claim the foregoing we have hereunto set our hands this 20th day of November, 1874.

JAMES EDGAR.
ALFRED BARDELL.

Witnesses:
W. HAUFF,
E. F. KASTENHUBER.